United States Patent [19]

Russell et al.

[11] Patent Number: 4,873,854

[45] Date of Patent: Oct. 17, 1989

[54] COMPUTER CONTROLLED COILING MACHINE

[75] Inventors: Frank S. Russell, Northboro; Timothy J. Hallihan, Charlton Depot, both of Mass.

[73] Assignee: Sleeper & Hartley Corp., Worcester, Mass.

[21] Appl. No.: 116,068

[22] Filed: Oct. 30, 1987

[51] Int. Cl.$^4$ ............................ B21F 3/04; B21F 11/00
[52] U.S. Cl. .................................... 72/12; 72/23; 72/132; 72/138
[58] Field of Search ....................... 72/10–12, 72/21–24, 27, 129, 131, 132, 135, 138, 142, 143

[56] References Cited

U.S. PATENT DOCUMENTS

| | | | |
|---|---|---|---|
| 2,119,002 | 5/1938 | Bergevin et al. | 72/132 X |
| 3,192,748 | 7/1965 | Lange | 72/14 |
| 3,342,052 | 9/1967 | Boy | 72/138 |
| 3,906,766 | 9/1975 | Sato | 72/12 |
| 4,112,721 | 9/1978 | Takase et al. | 72/12 |
| 4,236,397 | 12/1980 | Lange | 72/137 |
| 4,372,141 | 2/1983 | Russell et al. | 72/131 |
| 4,402,204 | 9/1983 | Russell et al. | 72/131 |
| 4,416,135 | 11/1983 | Russell | 72/130 |
| 4,524,597 | 6/1985 | Russell et al. | 72/135 |
| 4,528,831 | 7/1985 | Russell et al. | 72/131 |
| 4,607,513 | 8/1986 | Russell | 72/137 |
| 4,699,289 | 6/1987 | Itaya | 72/23 |

FOREIGN PATENT DOCUMENTS

| | | | |
|---|---|---|---|
| 565761 | 7/1977 | U.S.S.R. | 72/138 |
| 2023040 | 6/1979 | United Kingdom . | |
| 2063123 | 10/1980 | United Kingdom . | |

OTHER PUBLICATIONS

Western Electric Technical Digest No. 45, Jan. 1977, pp. 1, 2, "Winding of Metal Evaporator Charge Coils", Anderson et al.

Primary Examiner—E. Michael Combs
Attorney, Agent, or Firm—Wolf, Greenfield & Sacks

[57] ABSTRACT

A computer controlled wire coiling machine having three separately controllable motors for controlling wire feed, pitch tool operation and diameter tool operation. The machine includes a computer having a keyboard for setting predetermined parameters thereat regarding wire feed, spring pitch and spring diameter in constructing a predetermined spring. Three separate control signals are taken from the computer corresponding respectively to and for operating the three motors to thereby carry out the desired steps in forming the predetermined parameters that have been established.

46 Claims, 14 Drawing Sheets

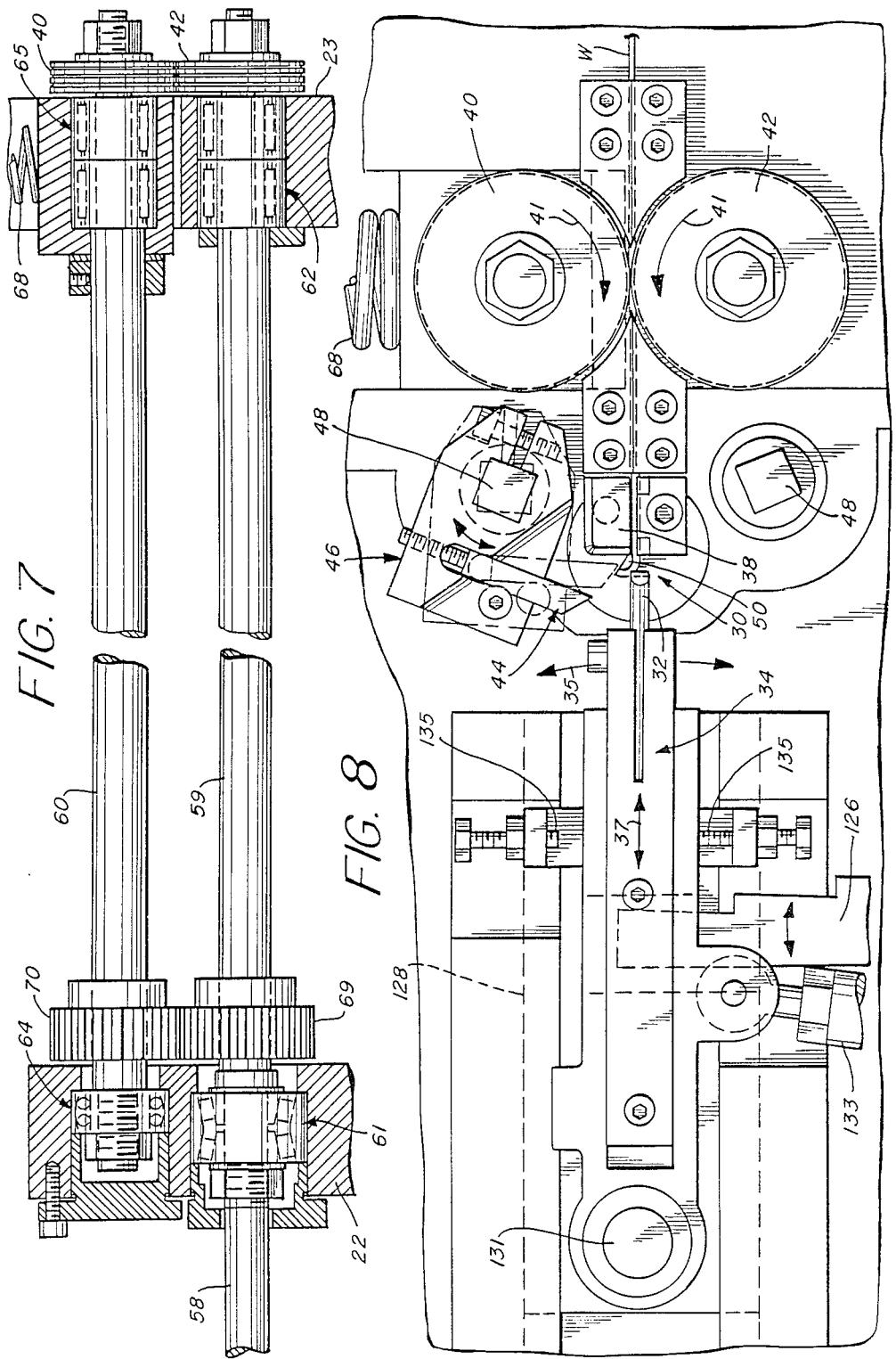

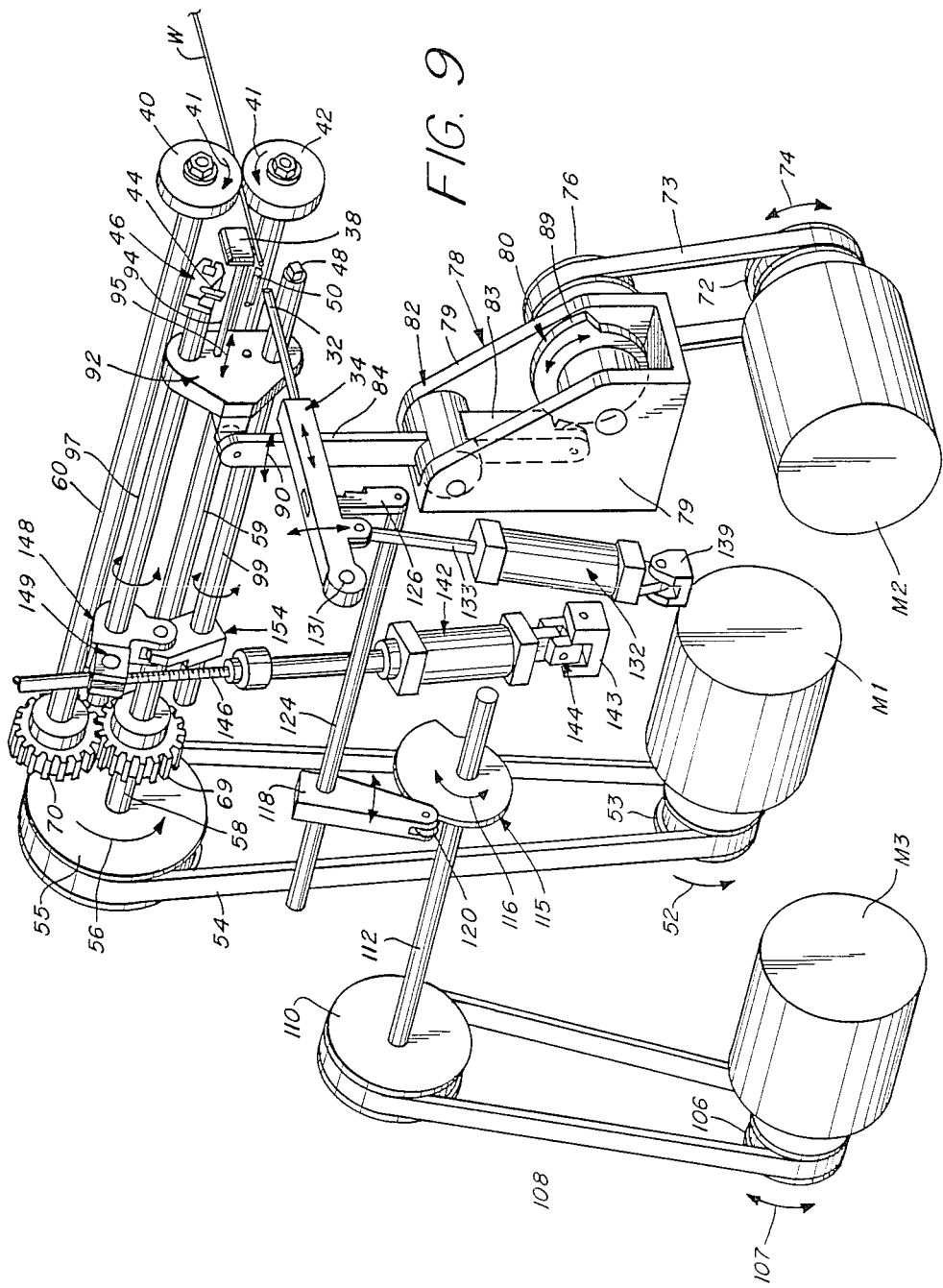

COMPUTER CONTROLLED COILING MACHINE

BACKGROUND OF THE INVENTION

1. Field of the Invention

The present invention relates in general to a wire coiling machine for forming a wide variety of different types of coil springs including, but not limited to, tension and compression springs. More particularly, the present invention pertains to a computer controlled wire coiling machine that is controlled to permit programming of a wide variety of springs.

2. Background Discussion

Various types of wire coiling machines are generally known in the art. By way of example, refer to U.S. Pat. No. 1,266,070 to Sleeper and U.S. Pat. No. 2,175,426 to Blount et al. Each of these patents show wire feed rollers that are in constant engagement with the wire but are driven intermittently by means of a reciprocable gear segment of a variable throw. For further background in connection with the invention herein, also refer to the following U.S. Pat. owned by the instant assignee herein: Nos. 4,372,141; 4,402,204; 4,416,135; 4,524,797; 4,528,831; and 4,607,513. These prior art wire coiling machines, such as the one described in U.S. Pat. No. 4,402,204 employ a cam shaft requiring a plurality of cams for controlling certain wire coiling functions. The cams are rotated at a cam shaft speed rate and because many of the operations carried out at the workstation are controlled from the cam shaft, the functions carried out are for the most part inter-dependent functions. These machines thus do not permit individual control of many of the parameters controlled at the workstation. Moreover, the machines described in these patents are not at all computer controlled.

Accordingly, it is an object of the present invention to provide an improved wire coiling machine and one which, in particular, is characterized by its computer control.

Another object of the present invention is to provide an improved wire coiling machine that is characterized by separate and independent control of predetermined parameters relating to the formation of coil springs.

A further object of the present invention is to provide an improved wire coiling machine as in accordance with the preceding object and which in particular is adapted for independent control of feed speed, pitch tool movement and diameter tool movement.

Still another object of the present invention is to provide an improved wire coiling machine characterized by computer control of the machine including the provision for entry of data for setting predetermined parameters regarding wire feed, spring pitch and spring diameter in connection with the construction of a predetermined spring configuration.

SUMMARY OF THE INVENTION

To accomplish the foregoing and other objects, features and advantages of the invention there is provided a wire coiling machine having a workstation at which a coil spring is formed. The wire coiling machine in accordance with the present invention is comprised of a machine frame and a pair of feed rollers supported in the machine frame adjacent to the workstation. Wire guide means may also be provided for guiding the fed wire to the work area. At the workstation the machine is also provided with a pitch tool and means for operatively supporting the pitch tool at the workstation. At the workstation there is also provided a diameter tool and means for operatively supporting the diameter tool at the workstation. Now, in accordance with the invention there are provided three separate motors that are computer controlled. There is a first motor means supported in the machine frame and selectively controlled to operate the feed rollers for directing wire to the workstation for coiling thereat. There is also a second motor means supported in the machine frame and selectively controlled to operate the pitch tool for controlling the pitch of the spring formed at the workstation. Lastly, there is a third motor means supported in the machine frame and selectively controlled to operate the diameter tool for controlling the diameter of the spring formed at the workstation. Computer control means is provided including a programmable computer, preferably having a printer associated therewith and furthermore including a keyboard entry means for setting predetermined parameters regarding wire feed, spring pitch and spring diameter in constructing a predetermined spring. The computer control means includes means for providing three separate control signals corresponding, respectively, to and for operating the first, second and third motor means to thereby carryout the desired steps informing the predetermined spring in accordance with the predetermined parameters that are set at the keyboard entry means.

In accordance with still further features of the present invention a cutting means is provided along with means for operatively supporting the cutting means at the workstation. The control means includes means for controlling the cutting means to cut the wire in synchronism with the computer control means controlling the first motor to stop wire feed. In accordance with a further feature of the present invention the second control signal may be variable during the forming of the spring to thus provide a variable pitch for certain applications. Also, the third control signal may be variable during the forming of a spring to thus provide a variable diameter for certain applications. Oscillatory cam means are provided for controlling the pitch tool movement at the workstation. The oscillatory cam means is driven from the second motor and has a control surface sweeping in a variable diameter. A follower is responsive to this control surface and couples to the pitch tool for controlling the position thereof. Similarly, there is an oscillatory cam means for controlling the diameter tool movement at the workstation. This oscillatory cam means is driven from the third motor and has a control surface sweeping in a variable diameter. A follower is responsive to this control surface and couples to the diameter tool for control of the position thereof.

BRIEF DESCRIPTION OF THE DRAWINGS

Numerous other objects, features and advantages of the invention should now become apparent upon a reading of the following detailed description taken in conjunction with the accompanying drawings, in which:

FIG. 7 is a cross-sectional view taken along line 7—7 of FIG. 2;

FIG. 8 is a more detailed enlarged fragmentary view of a portion of FIG. 1 in particular at the machine workstation;

FIG. 9 is a schematic perspective view illustrating the major parts of the machine and in particular illustrating the control at the workstation from the three separately controlled motors, namely the feed motor, the pitch tool control motor and the diameter tool control motor;

DETAILED DESCRIPTION

In connection with a description of a preferred embodiment of the present invention, reference is now made to the drawings herein. The drawings illustrate the details of a preferred embodiment of the machine and furthermore illustrate the sequences in connection with the formation of a typical spring. FIG. 1A of the drawings illustrates the block diagram for the computer control system as in accordance with the invention.

The wire coiling machine has a workstation at which a coil spring is formed. The machine is comprised of a machine frame with a pair of feed rollers for providing feed of the wire to the workstation. A pitch tool and a diameter tool are disclosed along with associated means for supporting each of these tools at the workstation. In accordance with the invention, three motors are provided. There is a first motor selectively controlled to operate the feed rollers. There is a second motor selectively controlled to operate the pitch tool and lastly, there is a third motor selectively controlled to operate the diameter tool. A computer control means is provided including a keyboard entry means for setting predetermined parameters regarding wire feed, spring pitch and spring diameter in constructing a predetermined spring. The computer control has output lines for providing three separate control signals corresponding respectively to and for operating the first, second and third motors to thereby carry out the desired steps in forming the predetermined spring in accordance with the predetermined parameters that have been established.

Figure 1:
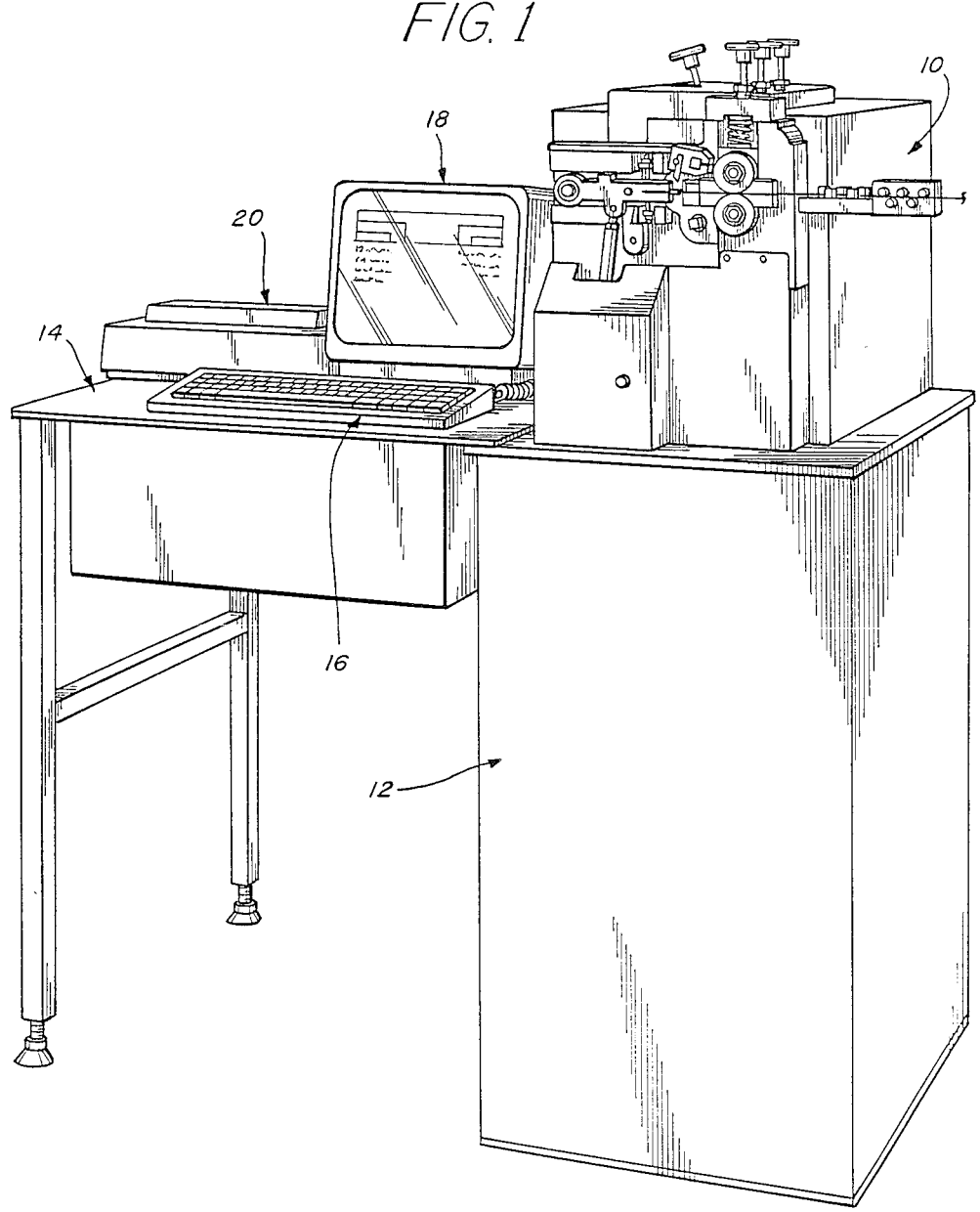
FIG. 1 is a perspective view of a computer controlled coiling machine of the present invention.
Figure 1A:
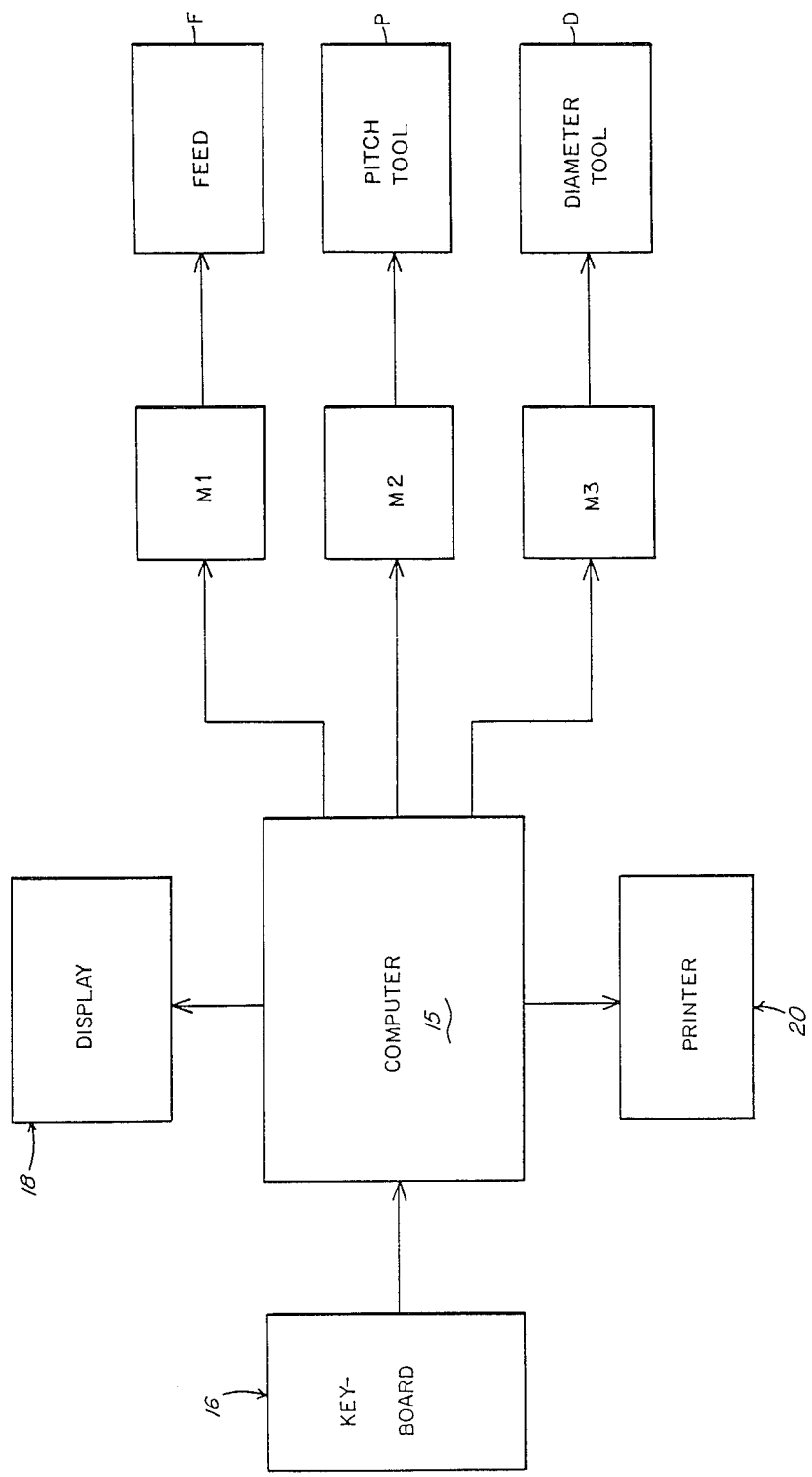
FIG. 1A is a block diagram of the computer control in accordance with the present invention illustrating the separate and independent control of feed, pitch and diameter motors.

With further reference to the drawings, FIG. 1 illustrates the overall machine in accordance with the present invention. In this regard there is provided a machine housing 10 inside of which are supported many of the mechanisms described hereinafter. The housing 10 is supported on an upright base 12. Extending adjacent to the base 12 is a table 14 upon which is supported the keyboard 16, display 18 and printer 20. Reference will be made hereinafter to these various components, particularly the computer related components, particularly in connection with the block diagram of FIG. 1A.

Now, referring to FIG. 1A, there is disclosed therein the computer 15. Associated with the computer 15 are the aforementioned keyboard 16, display 18 and printer 20. FIG. 1A illustrates three separate outputs from the computer 15 coupling to the respective control motors. These are described in FIG. 1A as motors M1, M2 and M3. Each of these separate motors control the parameters identified in FIG. 1A as the feed F, pitch tool control P and diameter tool control D. Reference will be made hereinafter to the control associated with the block diagram of FIG. 1A.

Figure 2:
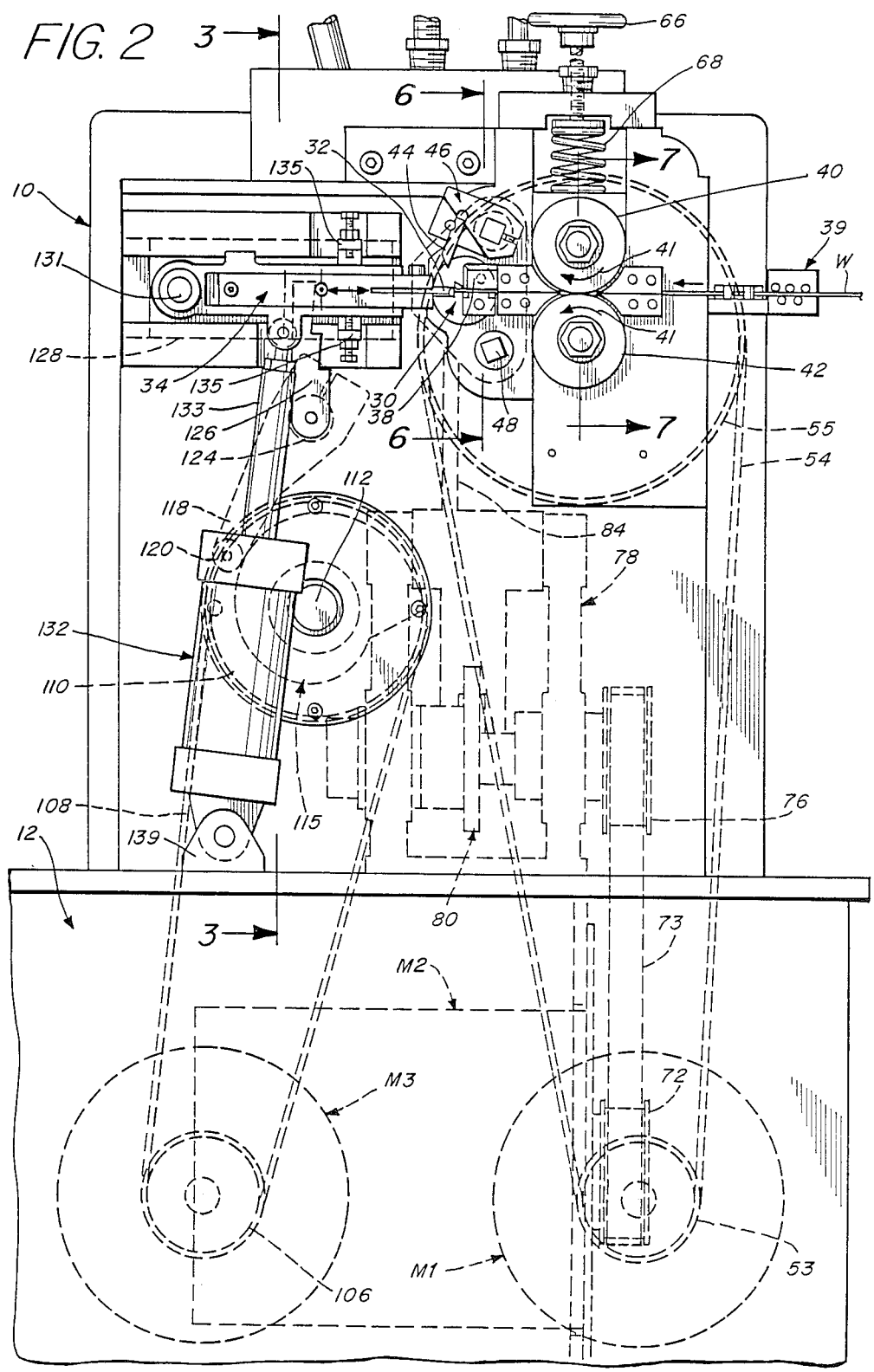
FIG. 2 is a front elevation view of the coiling machine of FIG. 1 illustrating the separate control of feed, pitch tool and diameter tool.
Figure 3:
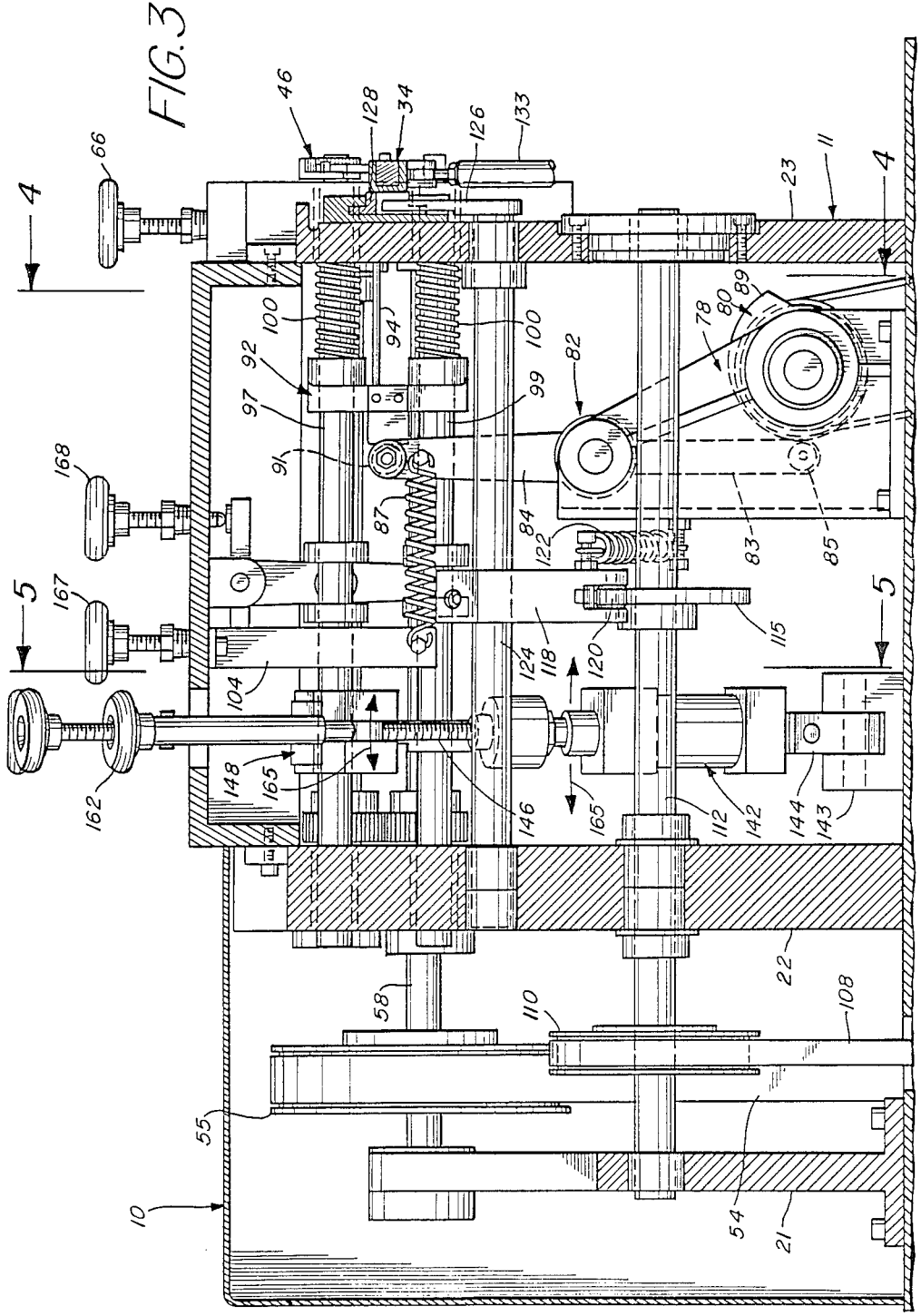
FIG. 3 is a cross-sectional view taken along line 3—3 of FIG. 2.

With further reference now to the details of FIGS. 1-9, within the housing 10 there is provided a machine frame 11 including, as depicted in FIG. 3, upright support members 21, 22 and 23. These support members are for support of various components comprising the wire coiling machine. Primarily, these upright members are for support of control shafts supported in the machine. The base 12 is primarily for the support of the motors. For example, FIG. 2 shows the feed motor M1, the pitch motor M2 and the diameter motor M3 all supported in the base 12. Each of these motors may be supported in a suitable manner not described in detail herein.

Reference is now made to FIG. 2 for an illustration of, not only the control motors supported in the base 12, but also the components that are controlled therefrom. FIG. 2 depicts a workstation generally at 30. For further details of the workstation area, also refer to the enlarged fragmentary view of FIG. 8. At the workstation 30 there is provided the diameter tool 32 supported by the tool holder 34. In FIG. 8 the arrows 35 and 37 illustrate the directions of movement that may take place of the holder 34 and likewise of the diameter tool 32.

FIGS. 2 and 8 also illustrate the pitch tool 38 at the workstation 30 and positioned, as described in further detail hereinafter, to be moved into the path of the wire W. Various guides are employed for directing the wire W to the workstation, such as illustrated at 39 in FIG. 2.

The wire W is fed to the workstation by means of the pair of feed rollers 40 and 42. These rollers are rotated in the direction indicated by the arrows 41 in FIGS. 2 and 8. The selective operation of the feed rollers 40 and 42 is discussed in further detail hereinafter.

Also disposed at the workstation 30 is the cutting tool 44 supported in holder 46 and operated from one of the two cut-off shafts 48. FIG. 2 also shows the alternate cut-off shaft 48 at a lower position at the workstation.

Thus, the wire W is fed by the feed rollers 40 and 42 through certain guide means to the workstation. Also disposed at the workstation is a coiling arbor 50 that the wire is coiled about and forming the spring. The pitch tool 38 controls the pitch of the coil and the diameter tool 32 controls the diameter of the coil.

In connection with the following description, reference may also now be made to the perspective view of FIG. 9. FIG. 9 illustrates the basic overall operation in connection with the control of the various components from the computer controlled motors, namely motors M1-M3. The motor M1 controls the feed of wire. This motor has an output shaft that rotates in the direction of the arrow 52. The output pulley 53 of the motor M1 drives a belt 54 which in turn drives the pulley 55 in the direction of arrow 56. The pulley 55 is secured to the lower feed roll shaft 58. The shaft 58 couples to the inline feed roller support shaft 59. Similarly, there is also provided an upper feed roller shaft 60. The feed roller 40 is secured to the shaft 60 and the feed roller 42 is secured to the shaft 59. In this regard, refer to FIGS. 3 and 7.

The lower feed roller shaft is supported by a bearing 61 at one end and by bearings 62 at the other end. Similarly, the upper feed roll shaft 60 is supported at one end by bearing 64 and at the other end by bearings 65. The bearing support arrangement permits a limited amount of relative movement between the feed rollers 40 and 42. The feed roller 40 is biased into contact with the feed roller 42 by means of the feed roller tension adjustment handle 66 and associated coil spring 68. This is an arrangement similar to that disclosed in U.S. Pat. No. 4,402,204.

Mounted on the feed roller shaft 59 is a gear 69. Similarly, mounted on the shaft 60 is a gear 70. The gears 69 and 70 are intermeshed. When the pulley 55 is driven from the feed motor M1 these interengaging gears cause the feed rollers 40 and 42 to rotate in the direction of the arrows 41 as depicted in, for example, FIGS. 2 and 9.

Reference is now made to the operation of the motor M2 that is the motor that controls the pitch tool. The motor M2, such as depicted in FIGS. 2 and 9, has an output pulley 72 that drives the drive belt 73. The pulley 72 is driven in an oscillatory manner as indicated by the bi-directional arrow 74 in FIG. 9. The belt 73 drives a further pulley 76 secured to a shaft supported by member 78. Member 78 includes sidewalls 79 between which the cam 80 is supported. The cam 80 is thus driven from the motor M2 in one direction or the other depending upon the desired positioning of the associated pitch tool 38.

Also supported in the open member 78 is the pitch tool follower 82 including oppositely extending follower arms 83 and 84. FIG. 3 in particular depicts a roller 85 associated with the arm 83. Also associated with the pitch tool follower 82 is return spring 87. The return spring 87 is secured to the arm 84 and biases the arm 83 so that the roller 85 is against the cam surface of cam 80.

The cam 80, such as depicted in FIG. 3, has a cam surface 89 that has a gradual varying diameter. In this connection, also refer to FIG. 9 for an illustration of the cam surface. As the motor M2 rotates in one direction or the other the cam surface is swept against the roller 85 and causes the arm 84 to move in one direction or the other. This bi-directional movement of the arm 84 is depicted in FIG. 9 by the bi-directional arrow 90.

Figure 6:
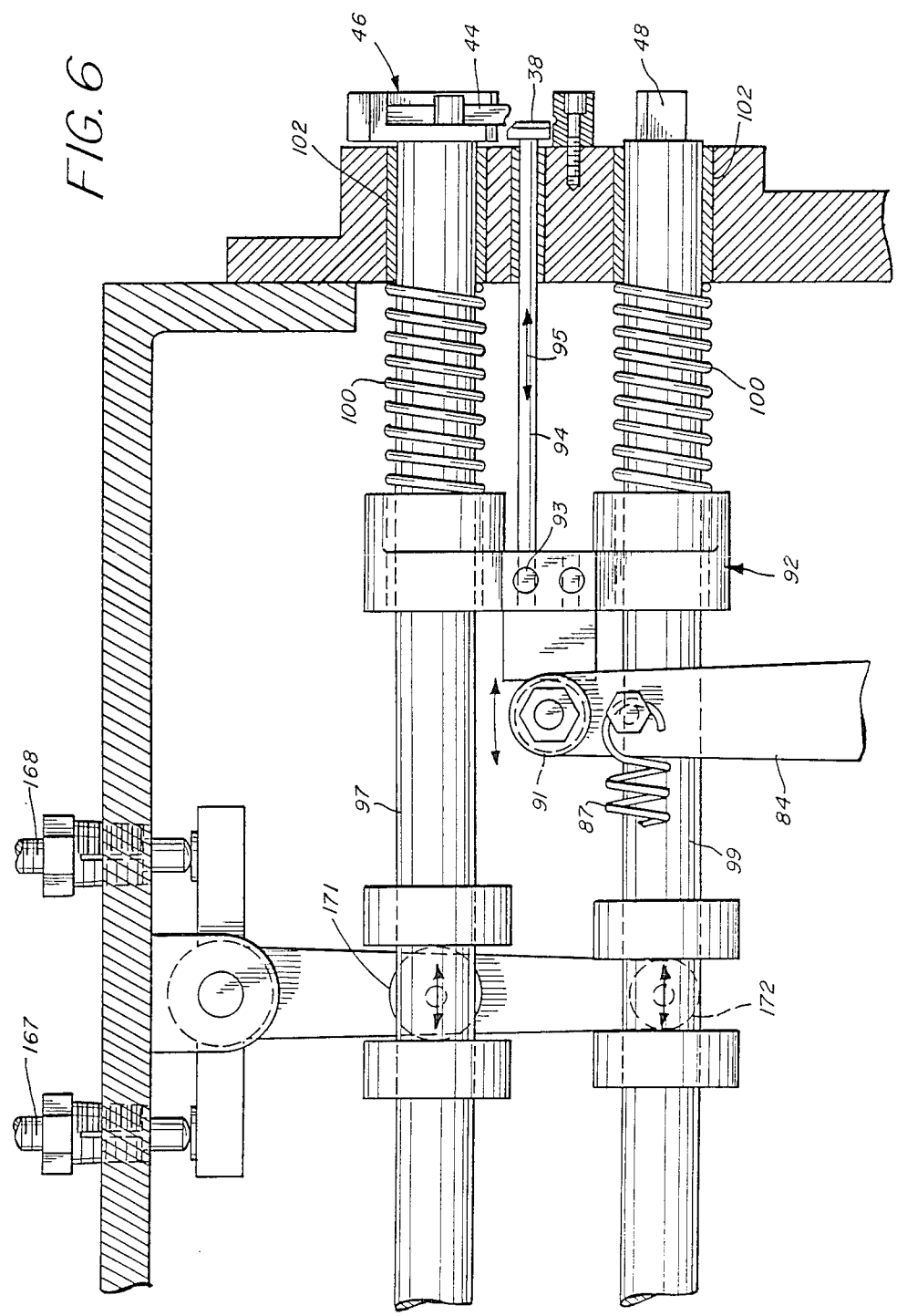
FIG. 6 is a cross-sectional view taken along line 6—6 of FIG. 2.

The top end of the arm 84, as depicted in, for example, FIG. 6, carries a roller 91 that engages the pitch tool carriage 92. The carriage 92 carries a locking pin 93 for locking the pitch tool 38 in place. The pitch tool 38 is carried by a tool shaft 94 as depicted in FIG. 6. FIG. 6 also illustrates by the arrow 95 the general bi-directional movement of the shaft 94 and thus also of the pitch tool 38. This movement is either toward or away from the wire with the displacement relative to the wire being a function of the desired pitch.

The pitch tool carriage 92 is carried by the cut-off shafts 97 and 99. FIG. 6 illustrates these cut-off shafts 97 and 99 with the carriage 92 transitioning thereon. The carriage 92 is biased against the roller 91 by means of a pair of coil springs 100 one associated with each of the cut-off shafts. Each of the springs 100 extends between the carriage 92 and an associated bushing 102. In FIG. 6 it is noted that the cutting tool holder 46 is secured to the cut-off shaft 97. The end of the shaft 99 extends to the shaft 48 that may support an auxiliary cutting tool.

Figure 4:
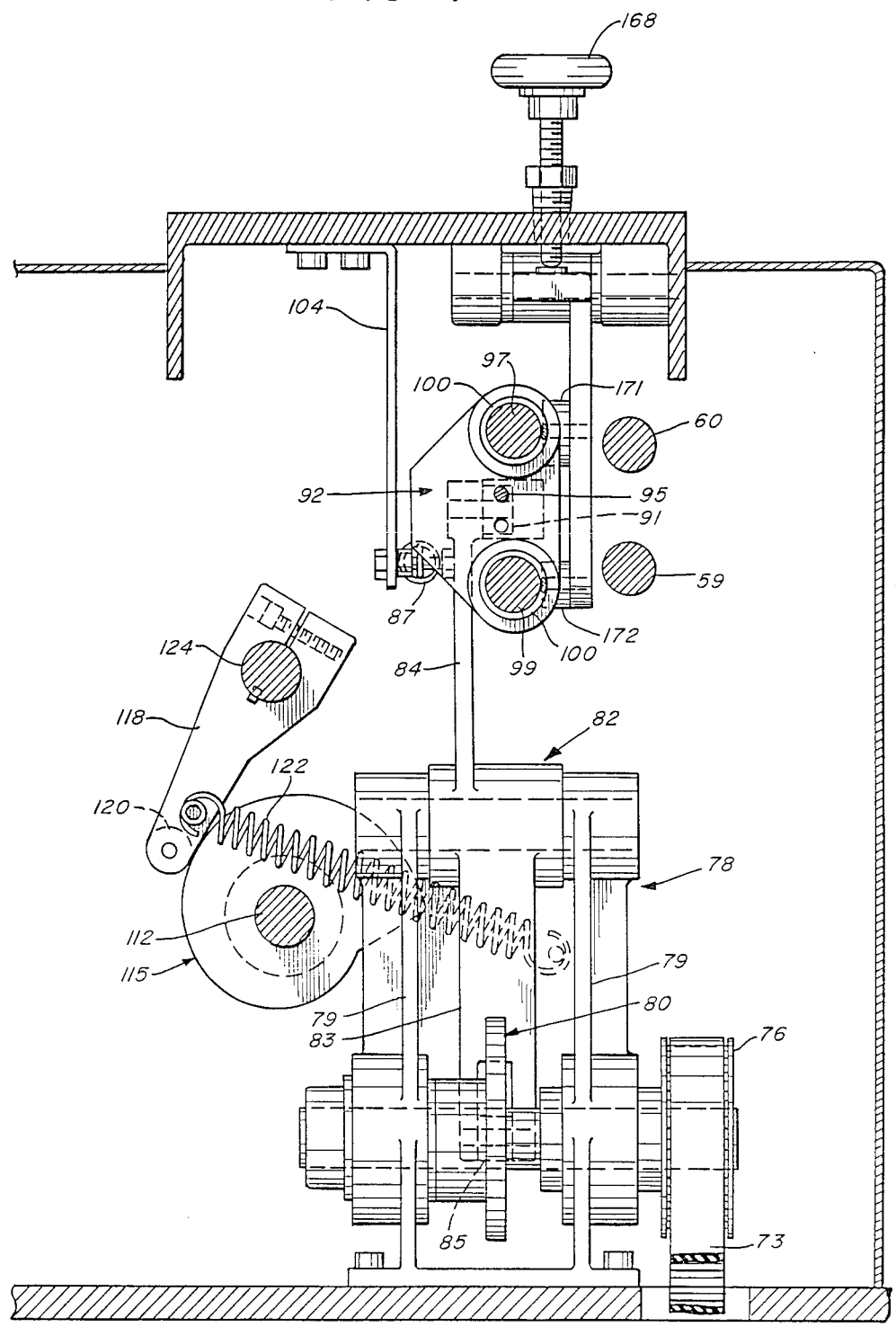
FIG. 4 is a cross-sectional view taken along line 4—4 of FIG. 3.

FIG. 4 also illustrates the cut-off shafts 97 and 99, as well as the pitch tool carriage 92. FIG. 4 also shows further details of the member 78 supporting the associated pitch tool control cam 80. Also illustrated in FIG. 4 is the carriage return spring 87 which is actually secured to the arm 84. The fixed end of the spring 87 is supported at an anchor strip 104.

Now, reference is made to the third motor, namely motor M3 which is the motor that controls the diameter tool 32. The motor M3 has an output pulley 106 that is adapted to be rotated in a bi-directional manner as indicated by the arrow 107 in FIG. 9. The pulley 106 drives the belt 108 which in turn engages with the pulley 110. The pulley 110 is supported on the shaft 112. FIG. 3 in particular illustrates the shaft 112 supported in members 21, 22, and 23. The shaft 112 supports the oscillatory cam 115. In FIG. 9 the direction of movement of the cam 115 is illustrated by the bi-directional arrow 116. Engaged with the oscillatory diameter tool cam 115 is the follower arm 118 which carries at its lower end a roller 120. The follower arm 118 also supports one end of a return spring 122 illustrated in FIG. 4. The other end of the return spring 122 is secured in a fixed manner such as from the member 78. The follower 118 is supported upon the shaft 124. The shaft 124 is also illustrated in FIG. 3 and is supported between the upright members 22 and 23.

The selective rotation of the shaft 124 controls the arm 126. Now, with further reference to FIG. 8, it is noted that the arm 126 operates the slide 128 which controls the movement of the diameter tool holder 34 in the direction of bi-directional arrows 37. The diameter tool 32 is also adapted to move in the direction of arrows 35 illustrated in FIG. 8. This is carried out by means of raising and lowering the tool holder, essentially pivoting at pivot 131. This action is carried out by the piston 132 such as is illustrated schematically in FIG. 9. Also associated with the action of the diameter tool holder in the direction of arrows 35 are the stops 135 as illustrated in FIG. 8.

As indicated previously, there is provided a piston 132 that is operated to essentially pivot the diameter tool holder. FIG. 2 illustrates the piston 132 secured at one end by securing bracket 139. The other end of the piston 132 has a piston rod 133 that couples directly to the tool holder for moving the tool holder in a pivoting action at the pivot point 131. As indicated previously, this causes the transition of the diameter tool 32 in the direction of the arrows 35 in FIG. 8.

Figure 5:
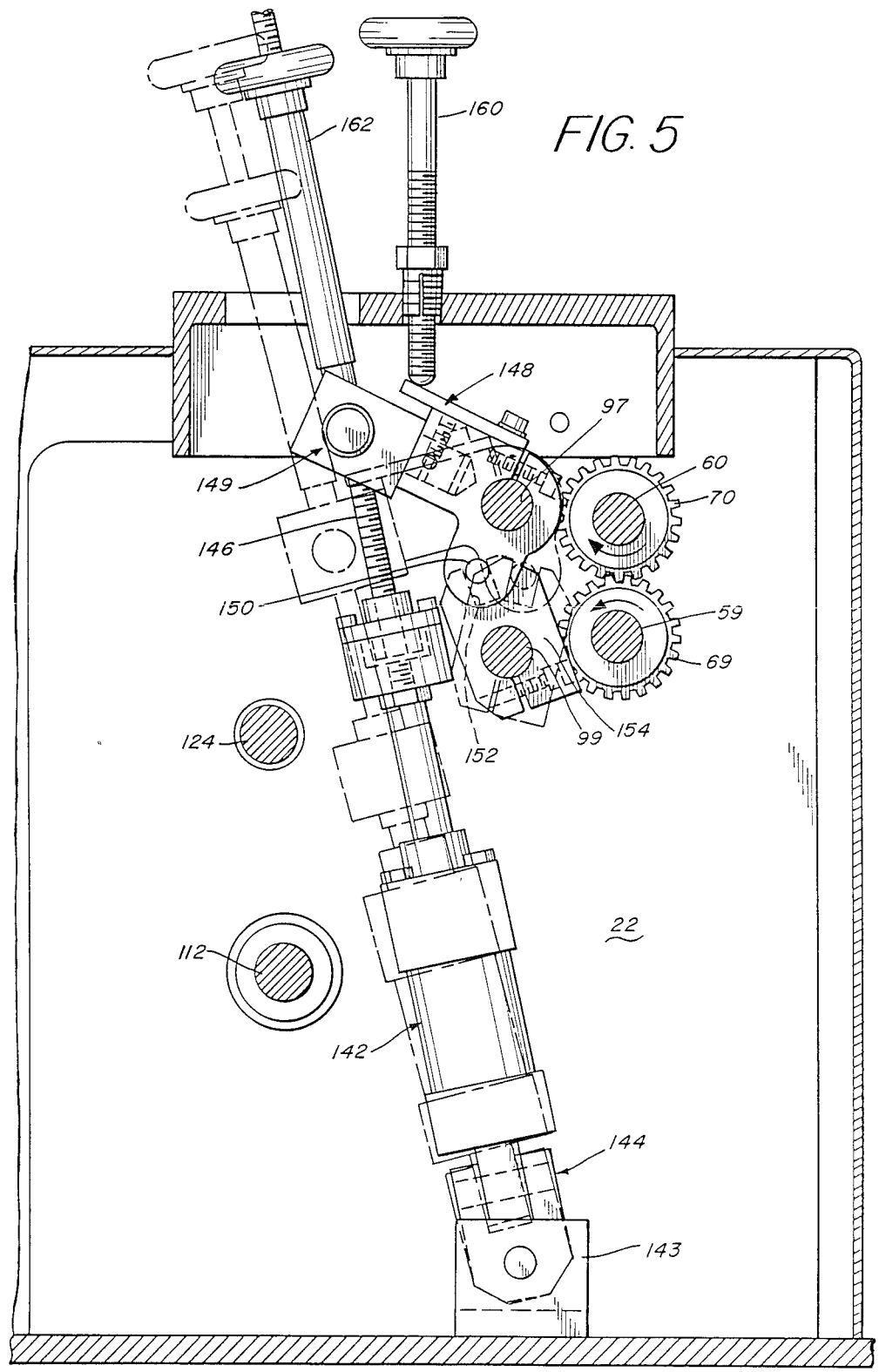
FIG. 5 is a cross-sectional view taken along line 5—5 of FIG. 3.

Now, in connection with the cutting tool operation, reference may be made to FIGS. 3, 5 and 9. In this connection, the cut-off shafts 97 and 99 are operated from the cut-off cylinder 142. The lower end of the air cylinder 142 is supported from support member 143 by means of the universal joint 144 as illustrated in FIG. 5. The threaded shaft 146 associated with the air cylinder 142 supports an actuating member 148 at the universal joint 149. The actuating member 148 is secured to the cut-off shaft 97. The member 148 supports a pin 150 that is adapted to fit within a groove 152 in the counterpart member 154. The member 154 is supported from the shaft 99. The pin 150 and the groove 152 provides cooperative action between the shafts 97 and 99.

In FIG. 5 the air cylinder 142 is shown extended for its non-cutting position and s illustrated in full outline in that position. The air cylinder 142 is also shown in phantom for its cut stroke. In FIG. 5 the member 160 is a cut-off tool swing adjustment for the open or non-cutting position. Also, in FIG. 5 the member 162 provides for cut-off tool swing adjustment for the cut-off stroke.

Referring to FIG. 3, it is noted that the cut-off air cylinder 142 is adapted to pivot in two directions to allow for actuation and adjustment for different wire diameters. In this regard note the arrows 165 in FIG. 3.

In FIG. 3, reference is also made to the adjustment knobs 167 and 168. These knobs adjust the cut-off tool in and out for different diameter wire grooves in the feed rollers. In this regard also refer to FIGS. 4 and 6. As particularly illustrated in FIG. 6, there are provided different diameter rollers at 171 and 172. This compensates for the different throw of the rocker arm when adjusting the cut-off tool to wire diameter. The larger diameter roller compensates for a shorter swing of the adjustment arm. The smaller roller provides for a larger swing.

Figure 14:
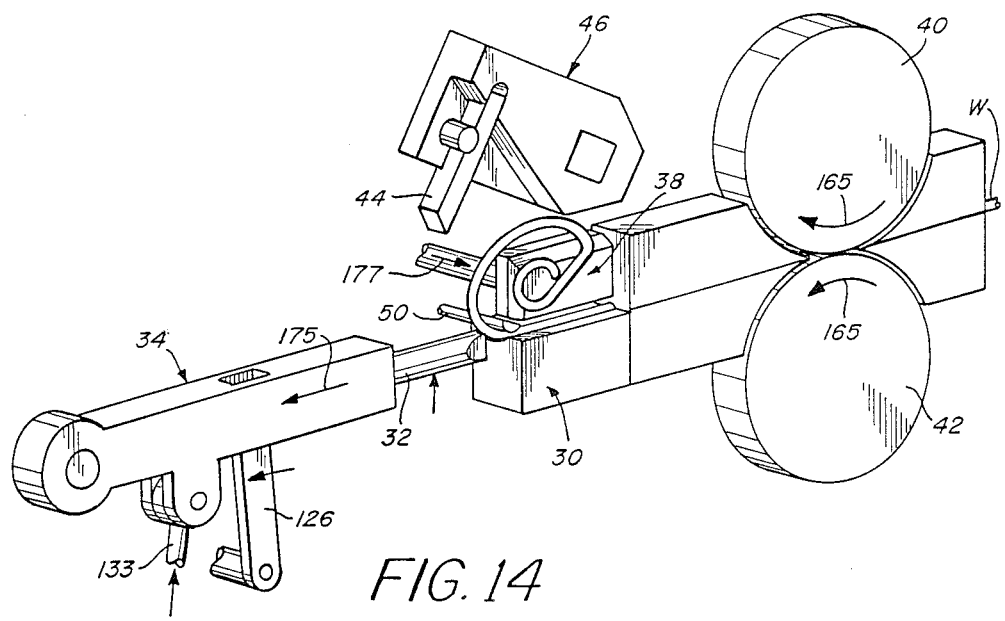
Figure 15:
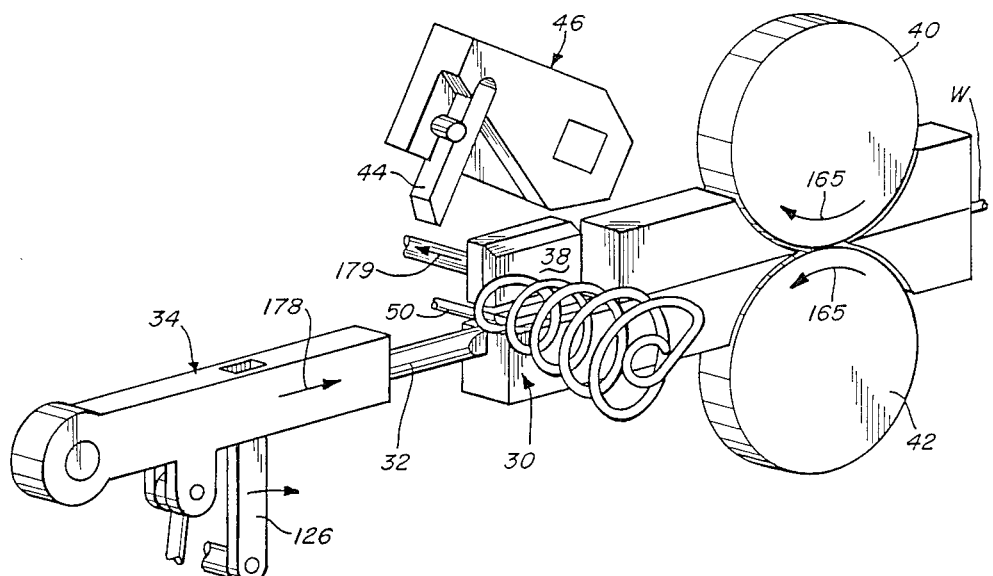
Figure 16:
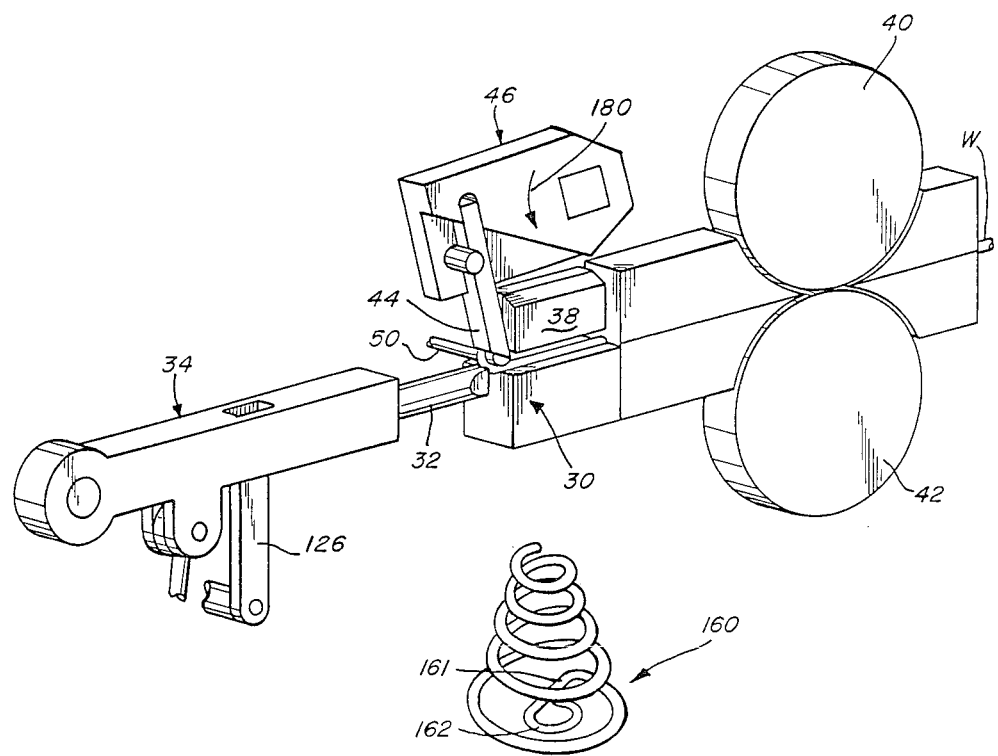

Reference is now made to the sequential steps illustrated in FIGS. 10–16 in connection with the formation of a tapered spring of the form illustrated in FIG. 16. In FIG. 16 refer to the spring 160 which is a variable tapered coil spring having, at its large diameter end, a leg 161 terminating in a loop 162. It is noted in the formation of this spring that as the diameter of the coils increases, also does the pitch, or in other words, the spacing between the coils. The spring illustrated in FIG. 16 is constructed from the leg end thereof.

Each of the sequential drawings illustrated in FIGS. 10–16 show the feed rollers 40 and 42 being selectively operated to feed the wire W to the workstation 30. Also illustrated in each of these sequential diagrams is the diameter tool 32, the pitch tool 38, the arbor 50, and the cutting tool 44. Each of the drawings also illustrate by representative arrows the direction of movement of the various tools.

Figure 10:
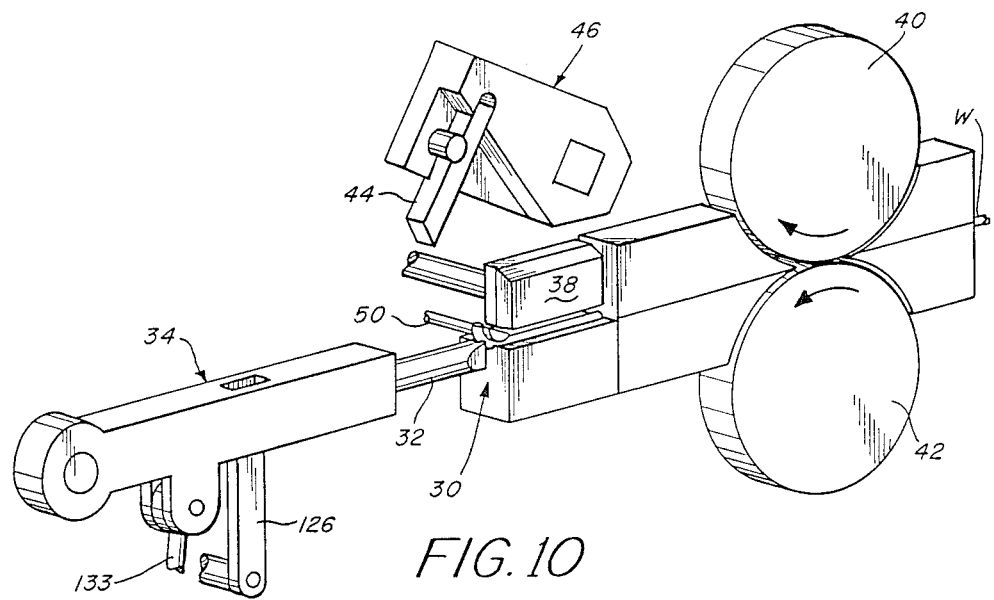
FIGS. 10-16 are fragmentary schematic diagrams illustrating a sequence of steps carried out and forming a tapered spring, the final form of which is illustrated in FIG. 16.

Now, in FIG. 10 this illustrates a very initial start in the formation of the spring. The wire has just been previously cut and the feed has just commenced. The pitch tool 38 is away from the workstation so that no pitch is made in connection with the formation of the initial coil. The initial coiling is just started in FIG. 10 with the wire being directed against the diameter tool 32. The diameter tool 32 is held in a predetermined longitudinal position as controlled by the arm 126 which in turn is controlled from the cam 115. Thus, the motor M3 is controlled under computer program control so that it controls the position of the diameter tool 32 to provide an initial diameter for the very initial loop 162 that is being formed. Also, the cut-off tool 44 is shown in a position away from the workstation. Cutting will only occur at the end of the spring making sequence.

Figure 11:
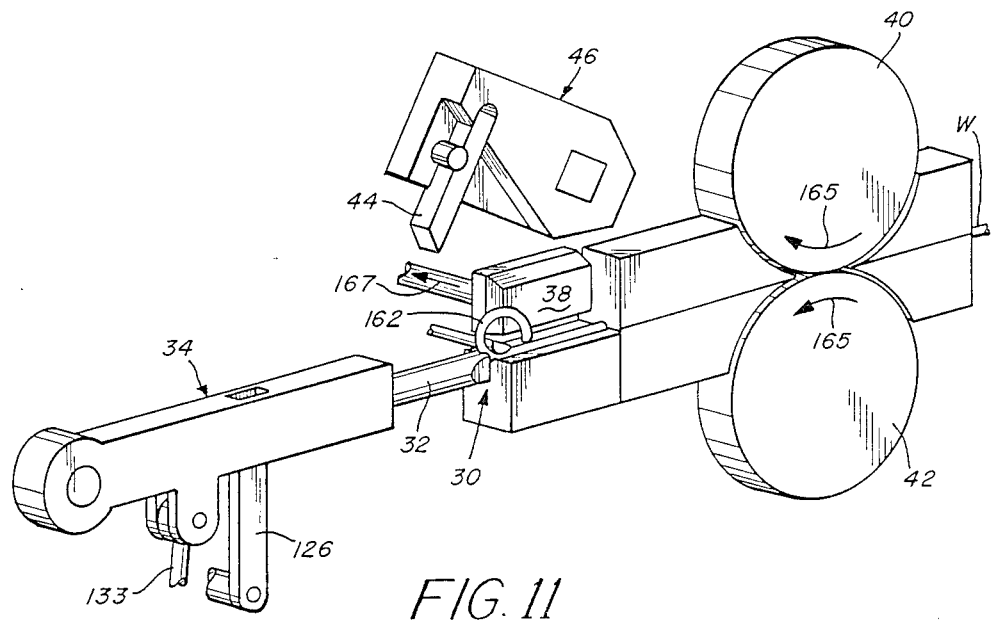

Now, reference is made to FIG. 11 showing the continuing sequence. In FIG. 11 the feed rollers continue to rotate as indicated by the arrows 165 and the complete loop 162 is then formed. During the formation of the loop, it is noted that the pitch tool 38 is away from the station as indicated by the arrow 167 in FIG. 11. The cutting tool 44 is also away from the workstation 30.

Figure 12:
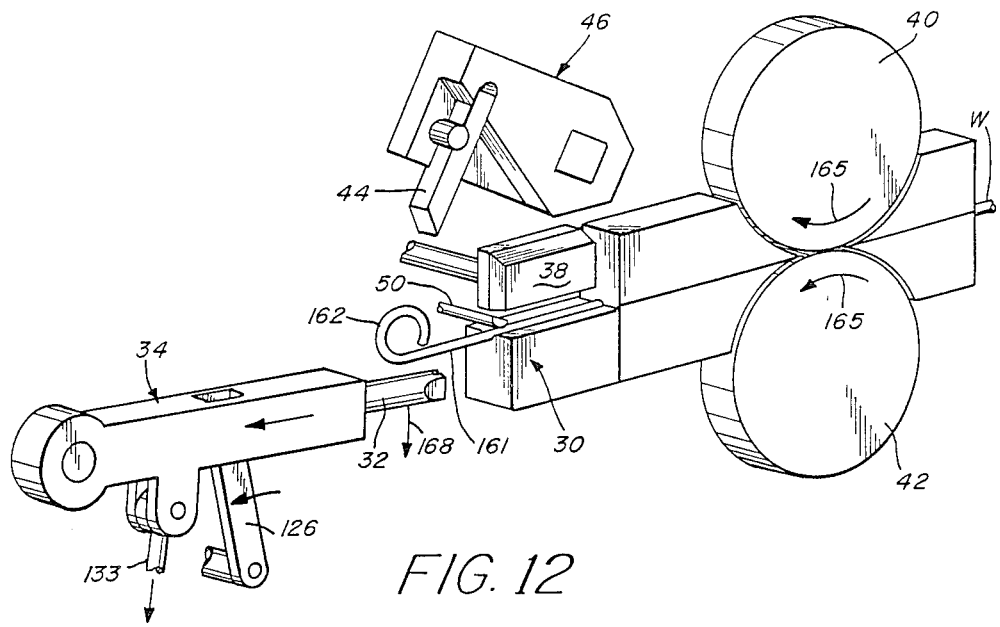

Reference is now made to the next step in the sequence illustrated in FIG. 12. This relates to the formation of the spring leg 161. In connection with this operation, it is noted that the pitch tool 38 is still away from the workstation 30, the cutting tool 44 is also away from the workstation. The feed rollers 40 and 42 continue to feed as indicated by the arrows 165 in FIG. 12. The diameter tool 32 is now operated to move downwardly under control of the piston 132. Essentially, a pivoting occurs of the diameter tool holder 34 to a downward position. This is illustrated in FIG. 12. By doing this, the diameter tool 32 is thus out of engagement with wire and thus a straight leg 161 may then be formed by simply feeding the wire directly through the workstation.

Figure 13:
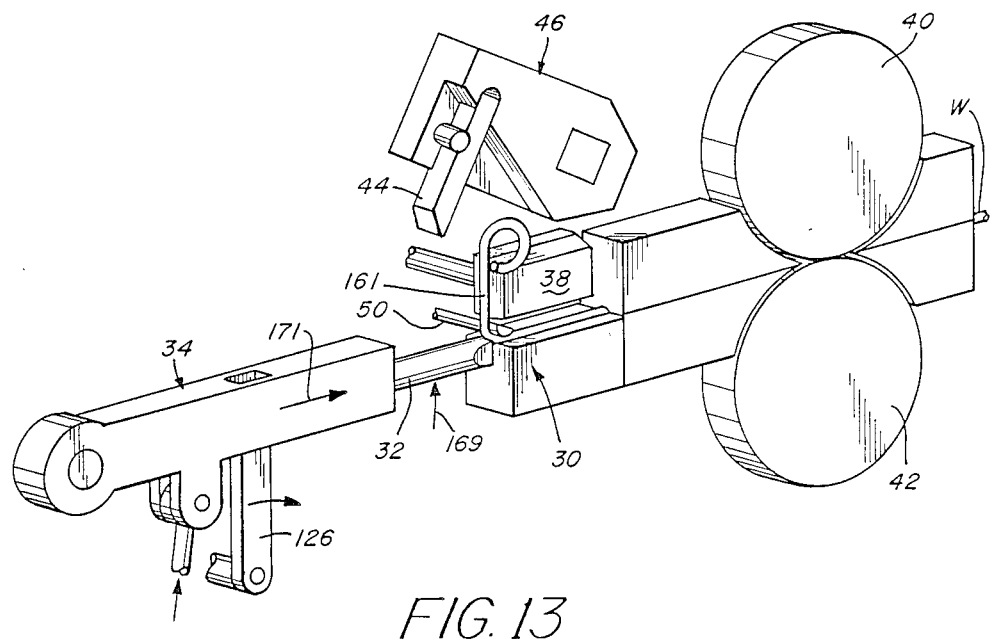

After a predetermined length of leg has been formed, then FIG. 13 illustrates the next step in the sequence. The diameter tool 32 is then moved upwardly as illustrated by the arrow 169 in FIG. 13. The arrow 168 in FIG. 12 illustrated the downward progression of the diameter tool 32. Prior to the diameter tool 32 moving upwardly, the feed is interrupted. This occurs by virtue of controlling the feed motor M1 so that the motor simply stops thus ceasing feed roller movement. Once this occurs then the diameter tool 32 moves in two directions. The tool moves upwardly as indicated by the arrow 169 and also moves inwardly as indicated by the arrow 171 in FIG. 13. The diameter tool preferably moves inwardly first and then moves upwardly to provide a bend as clearly illustrated in FIG. 13. This bend is formed about the arbor 50.

Reference is now made to FIG. 14 for a next step in the sequence. From FIG. 13 it can be seen that the entire leg 161 and loop 162 have now been formed and thus the rest of the spring is now formed by coiling. This now involved primarily only the diameter tool 32 and the pitch tool 38. With the particular spring illustrated in FIG. 16, the larger diameter section is now to be formed and in this larger diameter section the pitch is at a maximum when the diameter is at a maximum. The pitch and diameter then decrease to form the tapered spring as illustrated in FIG. 16.

Thus, in FIG. 14 the diameter tool 32 remains in its upper position but is moved outwardly as indicated by the arrow 175 in FIG. 14. The tool 32 is moved outwardly so as to provide a larger diameter coiling. At the same time the pitch tool 38 is also moved forwardly as indicated by the arrow 177 in FIG. 14. This thus provides a maximum diameter and a maximum pitch for initial coiling.

Reference is now made to FIG. 15 for a further sequence along the coiling step. Because one is fabricating a tapered spring the diameter decreases and at the same time the pitch also decreases. These directions of movement of the respective tools are illustrated in FIG. 15. The diameter tool 32 gradually moves in the direction of the arrow 178 while the pitch tool 38 gradually moves in the direction of the arrow 179. This is a gradual pre-programmed movement. A movement of the diameter tool 32 is controlled from the cam 115. The movement of the pitch tool 38 is controlled from the cam 80. The cams 115 and 80 are in turn controlled from the diameter motor M3 and the pitch motor M2, respectively.

After the coiling sequence is completed, the spring is then cut. In this regard, refer to the diagram of FIG. 16. The cutting is carried out by means of the cutting tool 44 which is pivoted as illustrated in FIG. 16 in the direction of the arrow 180. As indicated previously, the finished spring is also illustrated in FIG. 16 of variable tapered construction with the leg 161 having end loop 162.

Reference has been made hereinbefore to FIG. 1A. This block diagram illustrates the basic computer control system including the keyboard 16 and computer 15. The computer may be of conventional design and is programmed in a manner to be described in further detail hereinafter, particularly in connection with the display diagram of FIG. 17. The pitch diameter and feed controls are simple, direct and free of any backlash problems. The computer control system operates the mechanisms with extremely fine resolution sharing a precise control of speed and position.

The setting up of the system for making a particular spring can be carried out quite quickly. Values for spring pitch, spring diameter and speed of feed are entered directly at the keyboard 16. All cam work and manual adjustments for these functions have been eliminated. The software that is used with the system is menu driven, user friendly software. It is adapted to guide the operator, step by step, through the selection of values to be entered for any given spring. Thus, even a novice can learn how to make springs more quickly.

Figure 17:
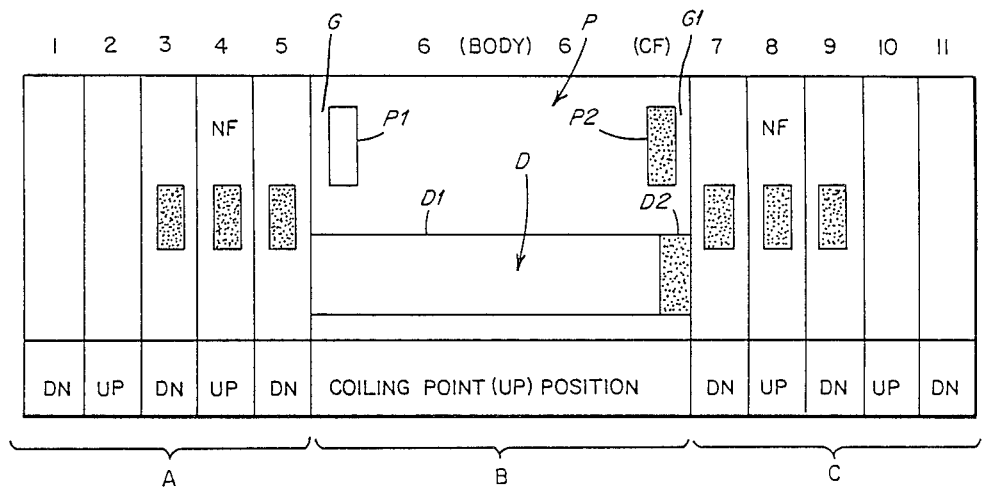
FIG. 17 is a diagram illustrating the display on a time scale as it relates to the formation of a spring.

Now, with reference to the setting up of the operation for making a particular spring, such as the spring illustrated in FIG. 16 herein, reference is now made to FIG. 17. FIG. 17 shows a display on the screen 18 that may be used in assisting the operator in setting up the parameters for making a particular spring. In this connection, it is noted that the mode of operation is such that there are basically two different modes of operation. In one mode of operation the program is established at the keyboard in connection with the making of the particular spring. Thereafter, the system can be set in the "run" mode of operation for carrying out the control in constructing the previously programmed spring.

With further reference to FIG. 17, it is noted that this diagram can be separated into basically three separate segments illustrated in FIG. 17 as segments A, B and C. The segments A and C relate to operations conducted on the spring outside of the spring body. The segment B relates to the sequence carried out in connection with forming the body of the spring. In the particular diagram of FIG. 17 the body of the spring has a taper with an even pitch. The ends of the spring as defined by the segments A and C control the ends of the spring and any forms that are to be made in the spring at either end thereof. It is noted that there are five separate subsegments associated with each of the segments A and C. Each of these segments is identified by a symbol UP or DN which relates to the placement of the diameter tool 32.

When the operator is in the programming mode of operation, this is the time that the operator can enter all of the particular parameters relating to all of the segments illustrated in FIG. 17. Each of the subsegments in segments A and C furthermore are definable on a subsequent basis. Thus, for example, in subsequent 3 one may program the machine to initially feed a very small portion of wire such as in FIG. 10. The segment 4 may then be a segment similar to that illustrated in FIG. 11 in which the diameter tool has been brought "UP" and forming a loop. The segment 5 may simply be a segment in which there is a leg formed. The segment 6 in FIG. 17 represents the body of the spring being formed. The other segments 7-11 represent other steps that can be performed at the other end of the spring.

Each of the separate subsegments illustrated in FIG. 17 are controlled separately by the operator. The operator, via the keyboard, can select each one of these segments and then enter the particular parameters associated with each of the segments or subsegments. With regard to the ends of the coil outside of the body these are each separated into subsegments and thus each subsequent can be controlled separately. The parameters that may be entered include the feed speed and possibly also the diameter and pitch tool parameters, although those parameters are introduced primarily in connection with the formation of a spring body.

Now, with regard to the segment B in FIG. 17, this is representative, as mentioned previously, of the formation of the spring body. One section of the segment relates to pitch tool control, namely segment P, the other portion of the segments relate to diameter tool control namely subsequent D. In connection with the pitch tool, the box P1 represents the pitch tool in engagement with the wire while the box P2 represents the pitch tool moving away from the workstation. The box D1 represents the diameter tool moving to engage the wire while the box D2 indicates the diameter tool disengaging from the wire. In the particular construction of spring illustrated in FIG. 17, it is noted that there is a small gap G before the pitch tool moves. There is also a gap G1 at the other end of the body. Both of these gaps are representative of areas where there is essentially a zero pitch for one or a part of a loop being formed in the coil spring.

In the particular coil spring being formed in FIG. 17, it has a taper and this is represented by the box D1 indicating a gradual change in diameter by gradual movement of the diameter tool at the workstation. The box D2 indicates withdrawal of the diameter tool at the end of the body.

During the segment B in FIG. 17, data is entered via the keyboard 16 to control the position at which the pitch tool is moved and to also control the variable nature of the diameter control. This can be controlled by setting high and low diameter tool parameters. In FIG. 17 the pitch tool is maintained at the same displacement at the workstation but likewise would be of a nature to provide a variable pitch.

Figure 18:
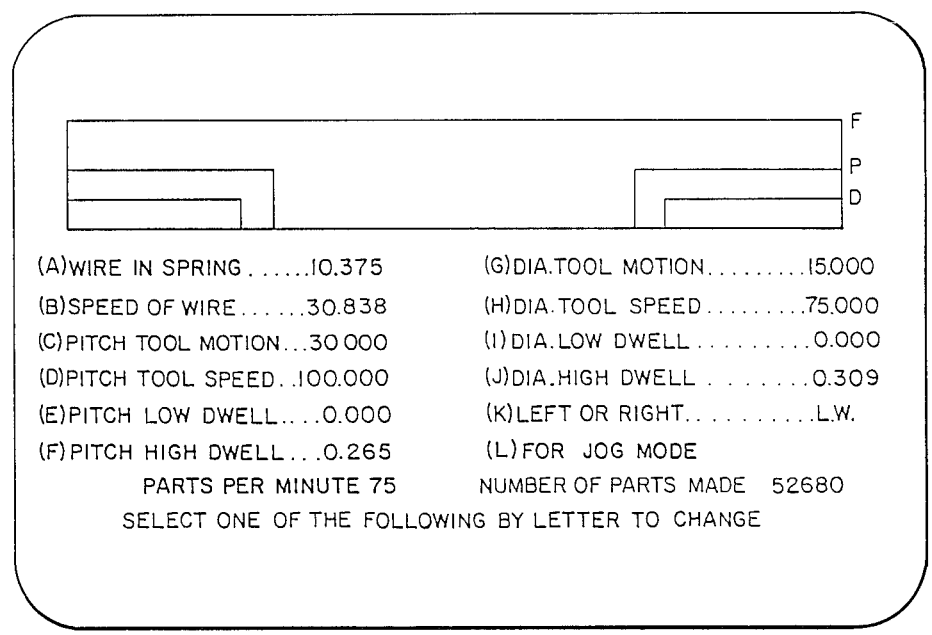
FIG. 18 is a further diagram of the display.

Reference is also now made to FIG. 18 showing a further display format. This is an illustration of the interrelationships of pitch, diameter and feed that can be established by the particular values the operator has entered. Note all of the parameters set forth in FIG. 18. These are in particular used in connection with the formation of the spring body. Also illustrated are typical values associated with these parameters.

In accordance with the present invention, it is noted that unlike previous mechanical machines, the computer control machine of the present invention has independent tool motions that are not limited by the speed or amount of wire feed. Also, tool forward speeds can be programmed to be radically different from tool return speeds. As a result, very unusual pitch and diameter configurations become relatively routine.

In summary, in accordance with the present invention, there is now described a computer controlled wire coiling machine that has the feed rollers controlled from a first motor that is selectively controlled to operate the feed rollers for directing wire to the workstation for coiling the pitch tool is controlled from a second motor also selectively controlled to operate the pitch tool for controlling the pitch of the spring being formed at the workstation. Lastly, there is a third motor for controlling the diameter tool and selectively adapted to operate the diameter tool for controlling the diameter of the spring formed at the workstation. Computer control means are provided including keyboard entry means for setting predetermined parameters regarding wire feed, spring pitch, and spring diameter in constructing a predetermined spring. The computer control means includes means for providing three separate control signals corresponding, respectively, to and for operating the first, second and third motors to thereby carry out the desired steps in forming the predetermined spring in accordance with the predetermined parameters that have been set.

Having now described a limited number of embodiments of the present invention, it should now become apparent to those skilled in the art that numerous other embodiments and modifications thereof are contemplated as falling within the scope of the present invention as defined by the appended claims.

What is claimed is:

1. A wire coiling machine having a work station at which a coil spring is formed and comprised of:
   a machine frame,
   a pair of feed rollers supported in said machine frame adjacent said work station,
   first motor means supported in said machine frame and selectively controlled to operate said feed rollers for directing wire to said work station for coiling,
   a pitch tool,
   means for operatively supporting said pitch tool at said work station,
   second motor means supported in said machine frame and selectively controlled to operate said pitch tool for controlling the pitch of the spring formed at said work station,
   first intercoupling means comprising first cam means having a continuously variable diameter control surface providing a continuously variable diameter coupling between said second motor means and said pitch tool for effecting positional linear control of the pitch tool at the work station at various preselected positions corresponding to various pitches of the coil spring being formed, wherein increments in movement of said first cam means over a predetermined range thereof provide corresponding increments in movement of said pitch tool over a predetermined range thereof, said increments of said respective ranges being linearly interrelated to selectively control spring pitch as a linear function of first cam means position,
   a diameter tool,
   means for operating supporting said diameter tool at said work station,
   third motor means supported in said machine frame and selectively controlled to operate said diameter tool for controlling the diameter of the spring formed at said work station,
   second intercoupling means comprising second cam means having a continuously variable diameter control surface providing a continuously variable diameter coupling between said third motor means and said diameter tool for effecting positional linear control of the diameter tool at the work station at various preselected positions corresponding to various diameters of the coil spring being formed, wherein increments in movement of said second cam means over a predetermined range thereof provide corresponding increments in movement of said diameter tool over a predetermined range thereof, said increments of said respective ranges being linearly interrelated to selectively control spring diameter as a linear function of second cam means position,
   and computer control means including keyboard entry means for setting predetermined parameters regarding wire feed, spring pitch and spring diameter in constructing a predetermined spring,
   said computer control means including means for providing three separate control signals corresponding respectively to and for operating said first, second and third motor means to thereby carry out the desired steps in forming said predetermined spring in accordance with said predetermined parameters set.

2. A wire coiling machine as set forth in claim 1 including a cutting means and means for operatively supporting said cutting means at said work station.

3. A wire coiling machine as set forth in claim 2 including means for controlling said cutting means to cut the wire in synchronism with said computer control means controlling said first motor to stop wire feed.

4. A wire coiling machine as set forth in claim 1 wherein said second control signal is variable during the forming of the spring to thus provide a variable pitch.

5. A wire coiling machine as set forth in claim 1 wherein said third control signal is variable during the forming of the spring to thus provide a variable diameter.

6. A wire coiling machine as set forth in claim 1 wherein said first cam means coupling between said second motor means and said pitch tool oscillate to control said pitch tool movement at said work station.

7. A wire coiling machine as set forth in claim 6 including a follower responsive to said control surface and coupling to said pitch tool for control of the position thereof.

8. A wire coiling machine as set forth in claim 1, wherein said second cam means coupling between said third motor means and said diameter tool oscillate to control said diameter tool movement at said work station.

9. A wire coiling machine as set forth in claim 8 including a follower responsive to said control surface and coupling to said diameter tool for control of the position thereof.

10. A wire coiling machine as set forth in claim 1 wherein said computer control means includes means for establishing a programming mode of operation and a run mode of operation.

11. A wire coiling machine as set forth in claim 1 wherein the spring forming steps are separated into separate step segments each separately controlled at said keyboard to control feed, spring pitch and spring diameter during that segment.

12. A wire coiling machine as set forth in claim 11 wherein the second motor means is operated to move said first intercoupling means by an amount directly related to the desired movement of the pitch tool movement.

13. A wire coiling machine as set forth in claim 11 wherein the third motor means is operated to move said second intercoupling means by an amount directly related to the desired movement of the diameter tool movement.

14. A wire coiling machine having a work station at which a coil spring is formed and comprised of:
   a machine frame,
   a pair of feed rollers supported in said machine frame adjacent said work station for feeding wire to said work station in a wire feed direction,
   first motor means supported in said machine frame, first intercoupling means for coupling said first motor means to said feed rollers, control means for selectively controlling said first motor means to operate said first intercoupling means, said first intercoupling means in turn operating said feed rollers for directing wire to said work station for coiling, a pitch tool, means for operatively supporting said pitch tool at said work station, said pitch tool having a working surface that engages said wire, second motor means supported in said machine frame, second intercoupling means for coupling said second motor means to said pitch tool, said second said intercoupling means comprising pitch tool position control means including a first cam means having a continuously variable diameter control surface for providing positional linear control of the pitch tool at the work station at various preselected positions corresponding to various pitches of the coil spring being formed, said second intercoupling means being selectively operated so that increments in movement of said second intercoupling means over a predetermined range thereof provide corresponding increments in movement of said pitch tool over a predetermined range thereof, said increments of said respective ranges being linearly interrelated to selectively control spring pitch as a linear function of said position control means movement, control means for selectively controlling said second motor means to operate said pitch tool position control means to move said pitch tool in a direction substantially orthogonal to said wire feed direction for controlling the pitch of the spring formed at said work station at a number of preselectable positions over said ranges, each position establishing a different pitch tool positioning corresponding to different spring pitches a diameter tool, means for operatively supporting said diameter tool at said work station, said diameter tool having a working surface that engages said wire, third motor means supported in said machine frame, third intercoupling means for coupling said third motor means to said diameter tool, said third intercoupling means comprising diameter tool position control means including a second cam means having a continuously variable diameter control surface for providing positional linear control of the diameter tool at the work station at various preselected positions corresponding to various diameters of the coil spring being formed, said third intercoupling means being selectively operated so that increments in movement of said third intercoupling means over a predetermined range thereof provide corresponding increments in movement of said diameter tool over a predetermined range thereof, said increments of said respective ranges being linearly interrelated to selectively control spring diameter as a linear function of said position control means movement, control means for selectively controlling said third motor means to operate said diameter tool position control means to move said diameter tool in said wire feed direction for controlling the diameter of the spring formed at said work station at a number of preselectable positions over said ranges, each position establishing a different diameter tool positioning corresponding to different spring diameters, diameter tool control means for moving said diameter tool in a direction that is simultaneously orthogonal to both said wire feed direction and said direction of motion of said pitch tool, for carrying out additional spring forming at said work station, and computer control means including keyboard entry means for setting predetermined parameters regarding wire feed, spring pitch, and spring diameter in constructing a predetermined spring, said computer control means including means for providing three separate control signals corresponding respectively to and for operating said first, second, and third motor means to thereby carry out the desired steps in forming said predetermined spring in accordance with said predetermined parameter set.

15. A wire coiling machine as set forth in claim 14, including a cutting means and means for operatively supporting said cutting means at said work station.

16. A wire coiling machine as set forth in claim 15, including means for controlling said cutting means to cut the wire in synchronism with said computer control means controlling said first motor to stop wire feed.

17. A wire coiling machine as set forth in claim 14, wherein said second control signal is variable during the forming of the spring to thus provide a variable pitch.

18. A wire coiling machine as set forth in claim 14, wherein said third control signal is variable during the forming of the spring to thus provide a variable diameter.

19. A wire coiling machine as set forth in claim 14, wherein said first cam means comprises oscillating cam means for controlling said pitch tool movement at said work station.

20. A wire coiling machine as set forth in claim 19, wherein said oscillatory cam means is driven from said second motor and has a control surface sweeping in a variable diameter.

21. A wire coiling machine as set forth in claim 20, including a follower responsive to said control surface and coupling to said pitch tool for control of the position thereof.

22. A wire coiling machine as set forth in claim 14, wherein said second cam means comprises oscillating cam means for controlling said diameter tool movement at said work station.

23. A wire coiling machine as set forth in claim 22, wherein said oscillatory cam means is driven from said third motor and has a control surface sweeping in a variable diameter.

24. A wire coiling machine as set forth in claim 23, including a follower responsive to said control surface and coupling to said diameter tool for control of the position thereof.

25. A wire coiling machine as set forth in claim 14, wherein said computer control means includes means for establishing a programming mode of operation and a run mode of operation.

26. A wire coiling machine as set forth in claim 14, wherein the spring forming steps are separated into separate step segments each separately controlled at said keyboard to control feed, spring pitch and spring diameter during that segment.

27. A wire coiling machine having a work station at which a coil spring is formed and comprised of:
   a machine frame,
   a pair of feed rollers supported in said machine frame adjacent said work station,
   first motor means supported in said machine frame and selectively controlled to operate said feed rollers for directing wire to said work station for coiling,
   a pitch tool,
   means for operatively supporting said pitch tool at said work station,
   second motor means supported in said machine frame and selectively controlled to operate said pitch tool for controlling the pitch of the spring formed at said work station,
   intercoupling means comprising cam means having a continuously variable diameter control surface providing a continuously variable diameter coupling between said second motor means and said pitch tool for effecting positional linear control of the pitch tool at the work station at various preselected positions corresponding to various pitches of the coil spring being formed, wherein increments in movement of said cam means over a predetermined range thereof provide corresponding increments in movement of said pitch tool over a predetermined range thereof, said increments of said respective ranges being linearly interrelated to selectively control spring pitch as a linear function of cam means position,
   a diameter tool,
   means for operatively supporting said diameter tool at said work station,
   third motor means supported in said machine frame and selectively controlled to operate said diameter tool for controlling the diameter of the spring formed at said work station, and
   computer control means including keyboard entry means for setting predetermined parameters regarding wire feed, spring pitch, and spring diameter in constructing a predetermined spring,
   said computer control means including means for providing three separate control signals corresponding respectively to and for operating said first, second, and third motor means to thereby carry out the desired steps in forming said predetermined spring in accordance with said predetermined parameters set.

28. A wire coiling machine as set forth in claim 27, including a cutting means and means for operatively supporting said cutting means at said work station.

29. A wire coiling machine as set forth in claim 28, including means for controlling said cutting means to cut the wire in synchronism with said computer control means controlling said first motor to stop wire feed.

30. A wire coiling machine as set forth in claim 27, wherein said second control signal is variable during the forming of the spring to thus provide a variable pitch.

31. A wire coiling machine as set forth in claim 27, wherein said third control signal is variable during the forming of the spring to thus provide a variable diameter.

32. A wire coiling machine as set forth in claim 27, wherein said cam means coupling between said second motor means and said pitch tool oscillate to control said pitch tool movement at said work station.

33. A wire coiling machine as set forth in claim 32, including a follower responsive to said control surface and coupling to said pitch tool for control of the position thereof.

34. A wire coiling machine as set forth in claim 27, wherein said computer control means includes means for establishing a programing mode of operation and a run mode of operation.

35. A wire coiling machine as set forth in claim 27, wherein the spring forming steps are separated into separate step segments each separately controlled at said keyboard to control feed, spring pitch, and spring diameter during that segment.

36. A wire coiling machine as set forth in claim 35, wherein the second motor means is operated to move said intercoupling means by an amount directly related to the desired movement of the pitch tool movement.

37. A wire coiling machine having a work station at which a coil spring is formed and comprised of:
   machine frame,
   a pair of feed rollers supported in said machine frame adjacent said work station,
   first motor means supported in said machine frame and selectively controlled to operate said feed rollers for directing wire to said work station for coiling,
   a pitch tool,
   means for operatively supporting said pitch tool at said work station,
   second motor means supported in said machine frame and selectively controlled to operate said pitch tool for controlling the pitch of the spring formed at said work station,
   a diameter tool,
   means for operatively supporting said diameter tool at said work station,
   third motor means supported in said machine frame and selectively controlled to operate said diameter tool for controlling the diameter of the spring formed at said work station,
   intercoupling means comprising cam means having a continuously variable diameter control surface providing a continuously variable diameter coupling between said second motor means and said diameter tool for effecting positional linear control of the diameter tool at the work station at various preselected positions corresponding to various diameters of the coil spring being formed, wherein increments in movement of said cam means over a predetermined range thereof provide corresponding increments in movement of said diameter tool over a predetermined range thereof, said increments of said respective ranges being linearly interrelated to selectively control spring diameter as a linear function of cam means position,
   and computer control means including keyboard entry means for setting predetermined parameters regarding wire feed, spring pitch, and spring diameter in constructing a predetermined spring,
   said computer control means including means for providing three separate control signals corresponding respectively to and for operating said first, second and third motor means to thereby carry out the desired steps in forming said predetermined spring in accordance with said predetermined parameters set.

38. A wire coiling machine as set forth in claim 37, including a cutting means and means for operatively supporting said cutting means at said work station.

39. A wire cutting machine as set forth in claim 38, including means for controlling said cutting means to cut the wire in synchronism with said computer control means controlling said first motor to stop wire feed.

40. A wire coiling machine as set forth in claim 37, wherein said second control signal is variable during the forming of the spring to thus provide a variable pitch.

41. A wire coiling machine as set forth in claim 37, wherein said third control signal is variable during the forming of the spring to thus provide a variable diameter.

42. A wire coiling machine as set forth in claim 37, wherein said cam means coupling between said third motor means and said diameter tool oscillate to control said diameter tool movement at said work station.

43. A wire coiling machine as set forth in claim 42, including a follower responsive to said control surface and coupling to said diameter tool for control of the position thereof.

44. A wire coiling machine a set forth in claim 37, wherein said computer control means includes means for establishing a programing mode of operation and a run mode of operation.

45. A wire coiling machine as set forth in claim 37, wherein the spring forming steps are separated into separate step segments, each separately controlled at said keyboard to control feed, spring pitch and spring diameter during that segment.

46. A wire coiling machine as set forth in claim 45, wherein the third motor means is operated to move said intercoupling means by amount directly related to the desired movement of the diameter tool movement.

* * * * *